US012626277B2

(12) United States Patent
Huang et al.

(10) Patent No.: US 12,626,277 B2
(45) Date of Patent: May 12, 2026

(54) SYSTEMS AND METHODS FOR CONTINUOUS INCREMENTALITY MONITORING OF TRACKED ELECTRONIC COMMUNICATIONS

(71) Applicant: Coupang Corp., Seoul (KR)

(72) Inventors: Yan Rui Huang, Sunnyvale, CA (US); Scott Thomas Sheinbaum, San Jose, CA (US)

(73) Assignee: Coupang Corp., Seoul (KR)

( * ) Notice: Subject to any disclaimer, the term of this patent is extended or adjusted under 35 U.S.C. 154(b) by 161 days.

(21) Appl. No.: 18/399,241

(22) Filed: Dec. 28, 2023

(65) Prior Publication Data

US 2025/0217849 A1     Jul. 3, 2025

(51) Int. Cl.
*G06Q 30/02* (2023.01)
*G06Q 30/0242* (2023.01)
*G06Q 30/0251* (2023.01)

(52) U.S. Cl.
CPC ..... *G06Q 30/0255* (2013.01); *G06Q 30/0244* (2013.01); *G06Q 30/0271* (2013.01)

(58) Field of Classification Search
CPC .................................. G06Q 30/0207–30/0277
See application file for complete search history.

(56) References Cited

U.S. PATENT DOCUMENTS

| | | | | |
|---|---|---|---|---|
| 9,665,885 | B1 * | 5/2017 | Allouche | ........... G06Q 30/0243 |
| 2008/0103897 | A1 | 5/2008 | Flake et al. | |
| 2013/0035975 | A1 * | 2/2013 | Cavander | ............... G06Q 30/02 |
| | | | | 705/7.22 |
| 2013/0204700 | A1 * | 8/2013 | Synett | ................ G06Q 30/0202 |
| | | | | 705/14.69 |
| 2014/0156383 | A1 | 6/2014 | Vijayaraghavan et al. | |
| 2015/0025961 | A1 | 1/2015 | Jorissen | |
| 2015/0310481 | A1 * | 10/2015 | Brown | ............... G06Q 30/0243 |
| | | | | 705/14.42 |
| 2016/0189201 | A1 * | 6/2016 | Shao | .................. G06Q 30/0243 |
| | | | | 705/14.42 |
| 2016/0210659 | A1 * | 7/2016 | Chittilappilly | ..... G06Q 30/0249 |
| 2016/0364935 | A1 * | 12/2016 | Koehler | ............ G06Q 30/0249 |
| 2018/0053208 | A1 * | 2/2018 | Upstone | ............ G06Q 30/0245 |
| 2020/0021873 | A1 * | 1/2020 | Swaminathan | .......... G06N 3/09 |

(Continued)

OTHER PUBLICATIONS

International Search Report and Written Opinion of the International Searching Authority, date of mailing Sep. 27, 2024, for counterpart International Application No. PCT/IB2024/052659 filed Mar. 19, 2024; 10 pgs.

(Continued)

*Primary Examiner* — Thuy N Nguyen
(74) *Attorney, Agent, or Firm* — FINNEGAN, HENDERSON, FARABOW, GARRETT & DUNNER LLP

(57) ABSTRACT

A computer system for channel incrementality, including tracking, using first data associated with at least one user device, at least one characteristic of a user, and tracking, using second data associated with the at least one user device, at least one first interaction with at least two tracked communications. The system further generates weight data for at least two channels which weighs an impact that each channel has on the user's tendency to complete a transaction. The system receives information on a completed transaction and apportions the transaction based on the weight data.

21 Claims, 6 Drawing Sheets

(56)        References Cited

U.S. PATENT DOCUMENTS

| | | | |
|---|---|---|---|
| 2021/0056573 A1* | 2/2021 | Wilson | G06F 12/1408 |
| 2022/0027813 A1* | 1/2022 | Gupta | G16H 50/80 |
| 2022/0215409 A1* | 7/2022 | Chittilappilly | G06Q 30/0242 |
| 2022/0309532 A1* | 9/2022 | Tsemekhman | G06Q 30/0246 |
| 2023/0101867 A1* | 3/2023 | Sapoznikov | G06Q 30/0247 |
| | | | 705/14.43 |
| 2023/0155702 A1* | 5/2023 | Wang | G06N 3/0495 |
| | | | 370/252 |
| 2025/0094879 A1* | 3/2025 | Zhao | G06N 3/084 |

OTHER PUBLICATIONS

Notice of Preliminary Rejection from the Ministry of Intellectual Property ("MOIP") dated Sep. 13, 2025, for counterpart Korean Patent Application No. 10-2024-0035402.
Office Action from Taiwan Intellectual Property Office dated Sep. 1, 2025, for counterpart Taiwanese Patent Application No. 11420928510.

\* cited by examiner

| User Identifier | First | Middle | | Last | | Transaction Info |
|---|---|---|---|---|---|---|
| Time | 10:00 am | 1:20 pm | 1:21 pm | 4:00 pm | 4:10 pm | |
| Channel | Ch 1 | Ch 2 | Ch 1 | Ch X | Ch 3 | • Type |
| Publisher | C1 Pub1 | C2 Pub3 | C1 Pub3 | | C3 Pub1 | • Product(s) ID |
| Tag | Tag 1 | Tag 1 | Tag 2 | NA | Tab 1 | • Total value |
| Org/ Not Org | Not Org | Not Org | Not Org | Org | Not Org | • Quantity |

|  | First | Middle | Last | Result |
|---|---|---|---|---|
| Weight | .13 | .27 | .6 |  |
| Ch 1 | 1 | .5 | 0 | .265 |
| Ch 2 | 0 | .5 | 0 | .135 |
| Ch 3 | 0 | 0 | 1 | .6 |
| C1 Pub1 | 1 | 0 | 0 | .13 |
| C1 Pub3 | 0 | .5 | 0 | .135 |
| C2 Pub3 | 0 | .5 | 0 | .135 |
| C3 Pub1 | 0 | 0 | 1 | .6 |
| Tag 1 | 0 | .5 | 1 | .865 |
| Tag 2 | 0 | .5 | 0 | .135 |

209

210

Channel Level 202

Publisher Level 203

Campaign Tag Level 204

FIG. 2B

401 — Launch campaign

403 — Receive user interaction

405 — Apportion transaction to campaign

407 — Evaluate campaign effectiveness

409 — Automatic campaign changes

SYSTEMS AND METHODS FOR CONTINUOUS INCREMENTALITY MONITORING OF TRACKED ELECTRONIC COMMUNICATIONS

TECHNICAL FIELD

The present disclosure generally relates to computerized systems and methods for targeted electronic advertising. In particular, embodiments of the present disclosure relate to inventive and unconventional systems to apportion sales between different advertising channels, determine effectiveness of an advertising campaign, and perform monitoring of the advertising channels to ensure the models used in these processes are accurate.

BACKGROUND

Consumers react to advertisements on different channels in different manners. A consumer may be strongly impacted by advertisements they receive on a first channel and are significantly more likely to make a purchase after receiving an advertisement on that first channel. However, the same consumer may be less impacted by advertisements they receive on a second channel and are not as likely to make a purchase after receiving an advertisement on the second channel. Further, a consumer's decision to make a purchase is not solely a result of the advertisements they receive. Instead, a consumer may have certain baseline purchasing tendencies that must be removed when determining an impact of an advertisement on a consumer. Existing systems are not able to determine what impact user interactions with advertisements on an individual channel had on a consumer's purchase or whether the interactions had any impact at all.

Therefore, there is a need for improved methods and systems for determining what impact individual advertising channels had on a consumer's purchase decision so companies can adjust marketing strategies accordingly. Further, in determining this impact, there is a need to remove a consumer's baseline purchasing tendencies.

As described above, advertisements on a first advertising channel may have a different impact on a consumer than advertisements on a second advertising channel. Further, across consumers, certain types of advertisements may perform better on some advertising channels than others. A company may want to target certain types of advertisements on advertising channels where they are most effective. Existing systems are not able to determine what impact user interactions with advertisements on an individual channel had on a consumer's purchase or whether the interactions had any impact at all. Further, existing systems are not able to make changes to advertising on an individual channel based on the impact.

Therefore, there is a need for improved methods and systems for determining what impact a type of advertisement has on an individual marketing channel so companies can adjust marketing strategies accordingly. Further, there is a need to make automatic marketing changes so that certain types of advertisements are on advertising channels where they are most effective.

As described above, advertisements on a first advertising channel may have a different impact on a consumer than advertisements on a second advertising channel. Further, the impact of each of these advertising channels may change with time. The impact of an advertising channel needs to be updated to accurately determine the impact of an advertisement received on that advertising channel. Existing systems are not able to determine what impact user interactions with advertisements on an individual channel had on a consumer's purchase or whether the interactions had any impact at all. Further, existing systems are static and are not able to determine whether credit attributed to an advertising channel is still accurate over time.

Therefore, there is a need for improved methods and systems to continuously monitoring changes to the impact an advertising channel has on consumers. Additionally, there is a need to update a model for apportioning a purchase based on the changes. Further, there is a need to apportion a consumer's purchase decision between multiple advertising channels based on the updated model.

SUMMARY

One aspect of the present disclosure is directed to a computer-implemented system comprising a memory storing instructions, and at least one processor configured to: track, using first data associated with at least one user device, at least one characteristic of a user, the user being associated with the at least one user device, track, using second data associated with the at least one user device, at least one first interaction with at least two tracked communications, each tracked communication being associated with a separate channel of at least two channels, generate weight data for the at least two channels which weighs an impact that each channel has on the user's tendency to complete a transaction. Wherein the generating weight data comprises: feeding the at least one characteristic of a user into a first model; feeding the at least one first interaction into the first model; and utilizing the first model to correlate a transaction completion tendency with the at least one characteristic and the at least one interaction.

Further, the processor is configured to track, using third data associated with the at least one user device, at least one second interaction with a tracked communication associated with at least one of the at least two channels, the third data including information associated with a completed transaction, apportion the completed transaction between each of the at least two channels and a third channel which is not associated with a tracked communication based on the generated weight data, and output information on the portion of the completed transaction attributable to each of the at least two channels and the third channel based on the apportionment.

Another aspect of the present disclosure is directed to a computer implemented method, comprising: tracking, using first data associated with at least one user device, at least one characteristic of a user, the user being associated with the at least one user device; tracking, using second data associated with the at least one user device, at least one first interaction with at least two tracked communications, each tracked communication being associated with a separate channel of at least two channels; generating weight data for the at least two channels which weighs an impact that each channel has on the user's tendency to complete a transaction. Wherein generating weight data comprises: feeding the at least one characteristic of a user into a first model, feeding the at least one first interaction into the first model, and utilizing the first model to correlate a transaction completion tendency with the at least one characteristic and the at least one interaction;

Further the method includes tracking, using third data associated with the at least one user device, at least one second interaction with a tracked communication associated with at least one of the at least two channels, the third data including information associated with a completed transaction, apportioning the completed transaction between each of the at least two channels and a third channel which is not associated with a tracked communication based on the generated weight data; and, outputting information on the portion of the completed transaction attributable to each of the at least two channels and the third channel based on the apportionment.

Another aspect of the present disclosure is directed to a computer-implemented system comprising a memory storing instructions, and at least one processor configured to: track, using first data associated with at least one user device, at least one characteristic of a user, the user being associated with the at least one user device, track, using second data associated with the at least one user device, at least one first interaction with at least two tracked communications, each tracked communication being associated with a separate channel of at least two channels, generate weight data for the at least two channels which weighs an impact that each channel has on the user's tendency to complete a transaction. Wherein the generating weight data comprises: feeding the at least one characteristic of a user into a first model; feeding the at least one first interaction into the first model; and utilizing the first model to correlate a transaction completion tendency with the at least one characteristic and the at least one interaction.

Further, the processor is configured to track, using third data associated with the at least one user device, at least one second interaction with a tracked communication associated with at least one of the at least two channels, the third data including information associated with a completed transaction, apportion the completed transaction between each of the at least two channels and a third channel which is not associated with a tracked communication based on the generated weight data, wherein apportioning the completed transaction further includes determining a portion of the price of the transaction that is not attributable to advertising, and output information on the portion of the completed transaction attributable to each of the at least two channels and the third channel based on the apportionment.

One aspect of the present disclosure is directed to a computer-implemented system comprising a memory storing instructions, and at least one processor configured to: launch, using first data associated with an advertising campaign, an advertising campaign to a plurality of users on at least two channels, track, for each of the plurality of users, using second data associated with at least one user device, at least one user interaction with the launched advertising campaign leading up to a transaction by the user, and determine the effectiveness of the launched advertising campaign. The effectiveness may be determined by: feeding the at least one user interaction into a model which weighs the impact that each of the at least two channels has on the user; wherein the model is created based on at least one past user interaction. Further, the processor may transmit instructions to make changes to the launched advertising campaign based on the determined effectiveness.

Another aspect of the present disclosure is directed to a computer implemented method, the method comprising: launching, using first data associated with an advertising campaign, an advertising campaign to a plurality of users on at least two channels, tracking, for each of the plurality of users, using second data associated with at least one user device, at least one user interaction with the launched advertising campaign leading up to a purchase by the user, and determining the effectiveness of the launched advertising campaign. Determining the effectiveness of the launched advertising campaign comprises: feeding the at least one user interaction into a model which weighs the impact that each of the at least two channels has on the user, wherein the model is created based on at least one past tracked user interaction. Further, the method may include transmitting instructions to make changes to the launched advertising campaign based on the determined effectiveness.

Another aspect of the present disclosure is directed to a computer-implemented system comprising a memory storing instructions, and at least one processor configured to: launch, using first data associated with an advertising campaign, an advertising campaign to a plurality of users on at least two channels, track, for each of the plurality of users, using second data associated with at least one user device, at least one user interaction with the launched advertising campaign leading up to a transaction by the user, wherein the second data associated with at least one user device comprises interaction data including at least one of click data or impression data, and determine the effectiveness of the launched advertising campaign. The effectiveness may be determined by: feeding the at least one user interaction into a model which weighs the impact that each of the at least two channels has on the user; wherein the model is created based on at least one past user interaction. Further, the processor may transmit instructions to make changes to the launched advertising campaign based on the determined effectiveness.

One aspect of the present disclosure is directed to a computer-implemented system comprising a memory storing instructions, and at least one processor configured to: store at least one parameter for testing at least one of at least two channels, determine the effectiveness of the at least one channel by testing the at least one channel based on the stored parameter, updating a model which weighs the impact that each of the at least two channels has on a user's purchasing tendencies based on the determined effectiveness, track, using first data associated with at least one user device, at least one user interaction with a tracked communication leading up to a transaction, apportion the transaction by feeding the at least one user interaction into the updated model, and and output information indicating a portion of the transaction attributable to the at least one channel based on the apportionment.

Another aspect of the present disclosure is directed to a computer implemented method, the method comprising: storing at least one parameter for testing at least one of at least two channels, determining the effectiveness of the at least one channel by testing the at least one channel based on the stored parameter, updating a model which weighs the impact that each of the at least two channels has on a user's purchasing tendencies based on the determined effectiveness, tracking, using first data associated with at least one user device, at least one user interaction with a tracked communication leading up to a transaction, apportioning the transaction by feeding the at least one user interaction into the updated model, and outputting information indicating a portion of the transaction attributable to the at least one channel based on the apportionment.

Another aspect of the present disclosure is directed to a computer-implemented system comprising a memory storing instructions, and at least one processor configured to: store at least one parameter for testing at least one of at least two channels, determine the effectiveness of the at least one channel by testing the at least one channel based on the stored parameter, updating a model which weighs the impact that each of the at least two channels has on a user's purchasing tendencies based on the determined effectiveness. The model is a logistic regression model and adjusting the weight of the at least one channel based on the determined effectiveness comprises at least one of: setting a minimum weight for the at least one channel and adjusting the model to weigh the at least one channel based on the minimum weight, setting a maximum weight for the at least one channel and adjusting the model to weigh the at least one channel based on the maximum weight, or setting a weight range for the at least one channel and adjusting the model to weigh the at least one channel based on the weight range. The processor is further configured to track, using first data associated with at least one user device, at least one user interaction with a tracked communication leading up to a transaction, apportion the transaction by feeding the at least one user interaction into the updated model, and and output information indicating a portion of the transaction attributable to the at least one channel based on the apportionment.

Other systems, methods, and computer-readable media are also discussed herein. Disclosed embodiments may include any of the above aspects alone or in combination with one or more aspects, whether implemented as a method, by at least one processor, and/or stored as executable instructions on non-transitory computer readable media.

BRIEF DESCRIPTION OF THE DRAWINGS

FIG. 2B illustrates a table of weighting user interactions across advertising channels and/or publishers based on proximity to a transaction, consistent with the disclosed embodiments.

DETAILED DESCRIPTION

Figure 1:
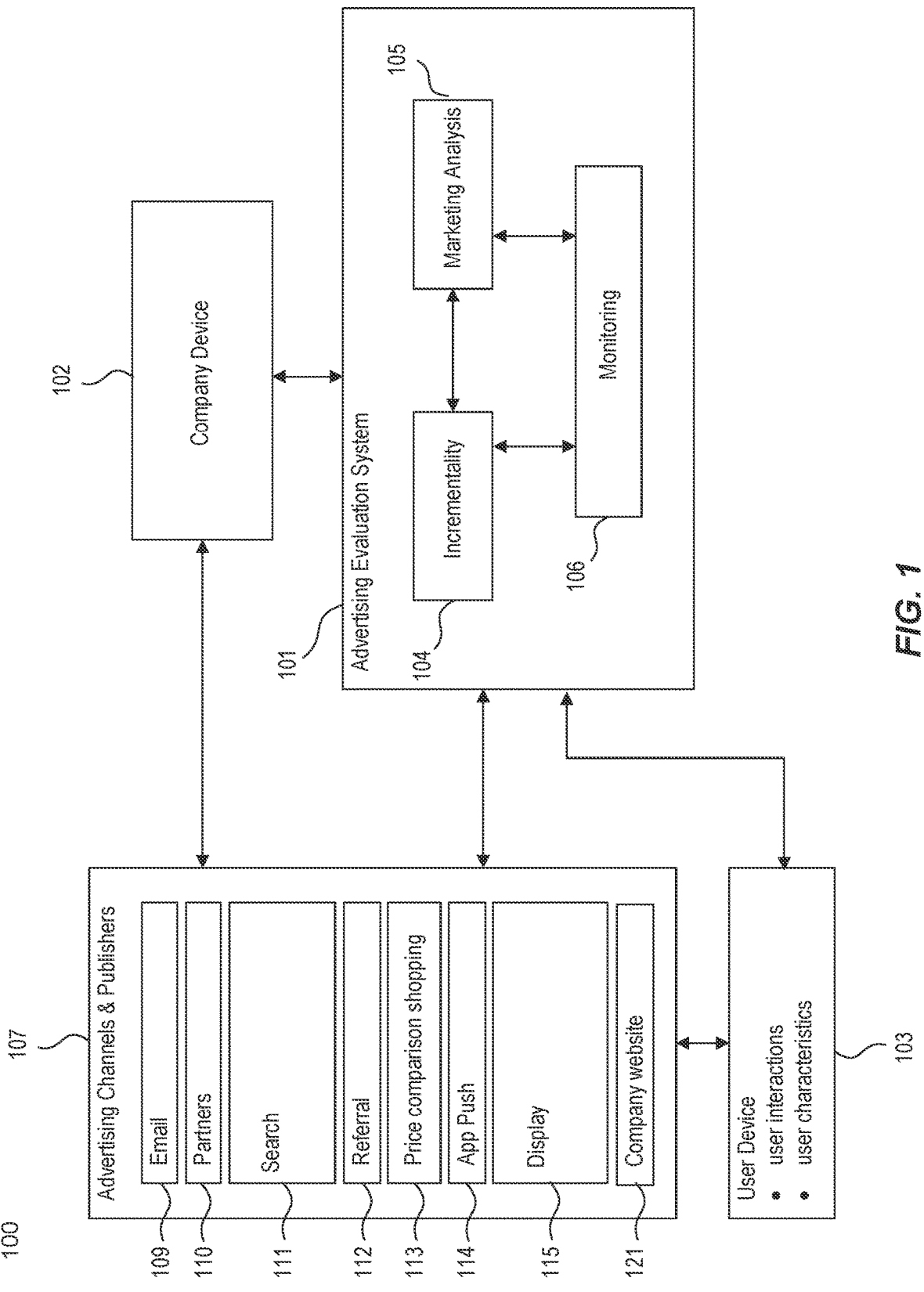
FIG. 1 is a schematic block diagram illustrating an embodiment of a network comprising computerized systems for advertising channel analysis, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims. Embodiments of the present disclosure are directed to systems and methods configured for targeted advertising.

Referring to FIG. 1, illustrating an embodiment of a network comprising computerized systems for advertising channel analysis, consistent with the disclosed embodiments. As illustrated in FIG. 1, system 100 may include a variety of systems, each of which may be connected to one another via one or more wireless networks. The systems may also be connected to one another via a direct connection, for example, using a cable. The depicted systems include Advertising Channels and Publisher Systems 107, Company Device 102, User Device 103, and Advertising Evaluation System 101. In some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Advertising Channels and Publisher Systems 107 may include one or more advertising channels and publishers that publish advertisements on a platform. In some embodiments, an advertising channel may refer to an avenue of providing advertisements. For example, a channel may include a group of publishers that distribute advertisements in a similar manner, such as a group of publishers that deliver advertisements in response to search terms. As further described below, a company may allocate one, two, three, or any number of publishers to a channel if they desire to track interactions made on platforms of those publishers together. A publisher may include one or more systems that publish advertisements to one or more platforms. In some embodiments a publisher may publish advertisements on a single platform, while in other embodiments a publisher may publish advertisements on multiple platforms. A platform may include a digital interface and associated software and coding to display advertisements and receive user interactions. Advertisements may include at least one of: content related to a company product, content related to a company service, content related to an event, or any other communication on a platform.

In some embodiments, an Email Channel 109 may comprise one or more systems that display email advertisements to users. Email advertisements may refer to advertisements received in the form of an email. Publishers within the Email Channel 109 may provide advertisements for one or more email platforms to display.

In some embodiments, Partners Channel 110 may comprise one or more systems that are managed by a different company that display advertisements to users. In some embodiments, the different company may include a company that sells products from multiple companies, including products of the company whose advertisements are to be tracked. Publishers within Partners Channel 110 may provide advertisements for one or more partner platforms to display.

In some embodiments, Search Channel 111 may comprise one or more systems that display advertisements to users on search interfaces. The advertisements may be displayed in response to one or more keywords being typed by the user. Publishers within Search Channel 110 may provide advertisements for one or more search platforms to display. For example, a Publisher may include a search engine and/or other computer systems that provide information to one or more search platforms (e.g. search display interfaces). A search platform may include an interface that allows users to search for content by typing words. For example, a user may be provided dog websites and or images upon typing "dog".

As further detailed below, a company device may specify one or more keywords that, if typed by a user, will cause the search platform to display an advertisement. A publisher and/or platform of the search channel may store keywords and include instructions for providing advertisements in response to the keywords. The company device may change the specified keywords automatically or through user input (e.g. next set of keywords is automatically pulled from a database of keywords).

In some embodiments, Referral Channel 112 may comprise one or more systems that display advertisements to one or more users based on another user sharing the advertising content with them. Publishers within Referral Channel 112 may provide advertisements for one or more platforms to display.

In some embodiments, Price Comparison Shopping Channel 113 may comprise one or more systems that display advertisements to users who are interacting with a price comparison platform. A price comparison platform may include an interface that allows a user to compare products and/or associated product pricing from different companies. Publishers within Price Comparison Shopping Channel 113 may provide advertisements for one or more Price Comparison Shopping platforms to display.

In some embodiments, App Push Channel 114 may comprise one or more systems that display advertisements to users through one or more applications. In some embodiments, one or more of the applications may include an application that is run by a company providing the advertised products. For example, the application may allow for a user to view advertisements, view deals, view available products, add products to a cart, and/or make a product purchase. Publishers within the App Push Channel 114 may provide advertisements for the application platforms to display.

In some embodiments, Display Channel 115 may comprise one or more systems that display advertisements to users on one or more platforms that are accessible by multiple people. For example, Display Channel 115, may include publishers that provide information to social media platforms.

In some embodiments, Company Website 121 may comprise a website managed by Company Device 102 that allows a user to view and purchase products. In some embodiments, Company Website 121 may display advertisements to users, while in other embodiments the Company Website 121 may simply allow for product selection and purchasing. Company Website 121 may allow users to perform one or more product transactions, such as clicking on product information (e.g. to see more details), adding a product to a cart, inputting payment information for a product, and/or purchasing a product. In some embodiments, completing a transaction may include performing at least one of the product transactions.

While the above advertising channels are shown as an example, any grouping of advertising platforms into a single channel is possible. For example, in some embodiments, the one or more platforms associated with the Display Channel 115 and the one or more platforms associated with the Price Comparison Shopping Channel 113 may be assigned to a single channel (e.g. through Company Device 102). Similarly, the one or more systems associated with Email Advertising Channel 109 and App Push Advertising Channel 114 may instead comprise a single channel. The grouping of platforms into separate channels may vary based on the tracking needs of a company selling an advertised product. For example, certain platforms may be included in a single channel by one company, but may be included in different channels by another company. Further, in some embodiments, the grouping of platforms into advertising channels is flexible. As further described below, a company may assign user interactions received by certain platforms to a desired advertising channel.

The grouping of publishers into separate channels may vary based on the tracking needs of the company selling an advertised product. For example, one company may consider certain publishers as part of a single channel, but another company may consider the publishers in separate channels. Further, in some embodiments, the grouping of publishers into advertising channels is flexible and may be changed by a company. As described below with reference to FIG. 2*a*, grouping publishers into a same channel may include assigning them the same channel identifier for tracking.

Advertising Channels and Publishers 107 are schematically shown grouped together. However, in some embodiments, the advertising channels and/or publishers may include one or more separate systems that communicate with other channel(s), other publisher(s), Company Device 102, User Device 103, Advertising Evaluation System 101, Incrementality System 104, Marketing Analysis System 105, and/or Monitoring System 106.

In some embodiments, the Advertising Channels and Publishers 107 may track characteristic information about a user who interacts on the platforms. In some embodiments, the publishers track characteristic information about a user who interacts on the platform. For example, a publisher (e.g. a social media publisher) may store information on user characteristics. A user (e.g. through one or more devices) may select different characteristics that they identify with and the user characteristic information may be based on these selections. For example, a user may make selections on the platform indicating their gender, age, location, company membership status (e.g. on Company Website 121), content they "liked", and/or events they have attended. In some embodiments, Advertising Channels and Publishers 107 may derive characteristic information based on the user selections.

Further, one or more publisher systems may derive user characteristic information from user activity on one or more platforms. In some embodiments, a publisher may track user interests by installing an impression tracker on a platform. For example, the impression tracker may include a transparent image associated with displayed content of a certain interest. Each time the displayed content and associated transparent image is loaded for display (e.g. on a browser), the system counts an impression. In some embodiments, the publisher may use a different means of impression tracking. A publisher may additionally or alternatively track user characteristic information by installing a click tracker on the platform. The click tracker may include installing cookies associated with displayed content of a certain interest and/or a click map that tracks user interactions. Each publisher may include specific software and/or coding to track user selections, user impressions, and/or user clicks.

In some embodiments, all of the user characteristic information received for the user is provided to the Advertising Evaluation System 101. In some embodiments, Advertising Evaluation System 101 may provide a portion of the user characteristic information. For example, the portion of user characteristic information sent may be based on user privacy selections on the platform and/or privacy regulations.

In some embodiments, the Advertising Channels and Publishers 107 may track user interactions with advertisements displayed on a platform. User interactions may include one or more of: clicks on the advertisement, swipes on the advertisement, impression on the advertisement, mouse hovering over the advertisement, additions to a cart on a company website, or removals from a cart on a company website. In some embodiments, the publishers track user interactions with advertisements displayed on the platform. A publisher may track user interactions with an advertisement by installing an impression tracker on the platform. The impression tracker may include a transparent image associated with the advertisement. Each time the advertisement is loaded for display (e.g. on a browser), the system counts an impression. Further, a publisher may code the impression tracker to provide a channel tag identifier, a publisher tag identifier, and/or an advertisement campaign identifier to the Advertising Evaluation System 101 upon detecting an impression.

A publisher may additionally or alternatively track user interactions with an advertisement by installing a click tracker on the platform. The click tracker may include cookies installed on the platform associated with the advertisement and/or a click map that tracks user interactions. Further, a publisher may code the click tracker to provide a channel tag identifier, publisher tag identifier, and/or an advertisement campaign identifier to the Advertising Evaluation System 101 upon detecting a click. In some embodiments, Company Website 121 may further track product transactions based on user selections and/or click tracking.

A publisher may additionally or alternatively track user interactions with an advertisement by installing a swipe tracker. For example, a publisher may code a platform to provide a channel tag identifier, publisher tag identifier, and/or an advertisement campaign identifier to the Advertising Evaluation System 101 upon detecting a swipe. A swipe may include the user moving an advertisement in any direction.

A publisher may additionally or alternatively track user interactions with an advertisement by installing a hover tracker and/or a map to track the hovering of a mouse. For example, a publisher may code a platform to provide a channel tag identifier, publisher tag identifier, and/or an advertisement campaign identifier to the Advertising Evaluation System 101 upon detecting hovering.

Advertising Channels and Publishers 107 may communicate directly and/or indirectly, through wired or wireless communication, with User Device 103, Company Device 102, and/or Advertising Evaluation System 101. A user on User Device 103 may launch one or more platforms from Advertising Channels and Publishers 107 on a device and perform the selections and/or interactions described above. Company Device 102 may communicate with Advertising Channels and Publishers 107 to make changes to advertisements for company products. Advertising Evaluation System 101 may communicate with Advertising Channels and Publishers 107 to receive information on user characteristics and/or user interactions.

Further, Advertising Channels and Publishers 107 may include one or more computer systems. For example, a publisher system may include at least one processor (such as an x86 or x64 compatible processor) and at least one memory storage device (such as flash memory). For example, publisher system may store list(s) tracking user characteristic information and/or user interactions in one or more databases, data stores, flat files, or other storage modalities on one or more memory storage devices. Further, a publisher system may communicate with additional systems, platforms, databases, and/or cloud storage centers (not shown) to store user characteristic information, receive user characteristic information, and/or to perform any function of the disclosed embodiments.

Company Device 102 may include one or more devices and/or systems that allow for a company to sell products, track advertising, and/or make changes to product advertising. Company device 102 may be implemented as a computer, laptop, tablet, mobile phone, smart phone, PDA, or any other computerized system that allows for a company employee to communicate with Advertising Channels and Publishers 107 and Advertising Evaluation System 101. Company Device 102 may communicate directly and/or indirectly, through wired or wireless communication, with Advertising Channels and Publishers 107 and/or Advertising Evaluation System 101. Company Device 102 may communicate with Advertising Channels and Publishers 107 to set advertising information. For example, Company Device 102 may provide advertising content to one or more platforms of Advertising Channels and Publishers 107. Advertising content may include product pictures, descriptions, sale details, code for content display, cookie tracker for the advertisement, and/or impression pixels for the advertisement. Company Device Device 102 may provide parameters for display of the advertising content to one or more platforms of Advertising Channels and Publishers 107.

Parameters for display of advertising content may include display location on a platform, time of display, timeframe for display, search keywords that trigger the display, cost allocated for display, number of users to receive the advertisement, and/or type of users to receive the advertisement. Company Device Device 102 may provide other information for tracking the displayed advertised content to one or more platforms of Advertising Channels and Publishers 107. Tracking information may include a channel tag identifier, publisher tag identifier, and/or an advertisement campaign identifier. In some embodiments, this information may be provided separately from the advertisement content, while in other embodiments this information is embedded in code associated with the advertised content.

Company Device 102 may update Company Website 121 to include new products, change product descriptions, change product images, change product pricing, and/or change product advertisements. Company Device 102 may communicate with Advertising Evaluation System 101 to track advertising. For example, Company Device 102 may receive evaluation information and make changes to advertisement display parameters. In some embodiments, Advertising Evaluation System 101 may be part of Company Device 102, while in other embodiments they may be separate.

Company Device 102 may include one or more computer systems, including at least one processor (such as an x86 or x64 compatible processor) and at least one memory storage device (such as flash memory). For example, Company Device 102 may store advertising parameters associated with one or more platforms, available products, and/or user information in one or more databases, data stores, flat files, or other storage modalities on one or more memory storage devices. Further, Company Device 102 may communicate with additional systems, platforms, databases, and/or cloud storage centers (not shown) to store advertising parameters, receive advertising parameters, and/or to perform any function of the disclosed embodiments.

Advertising Evaluation System 101 may include one or more systems that allow for a company to evaluate advertising effectiveness. As further described below, advertising evaluation can be specific to a user, channel, publisher, and/or advertisement content. Advertising Evaluation System 101 may include an Incrementality System 104, Marketing Analysis System 105, and/or a Monitoring System 106. Incrementality System 104 may include one or more systems that allow for a user transaction to be apportioned to one or more channels and/or publishers.

The Incrementality System 104 may store one or models for determining the weight that user characteristics has on probability to complete a transaction (e.g. including, make a purchase, add an item to a cart, etc.). The Incrementality System 104 may store one or more models for determining the weight that an advertising channel and/or a publisher has on a probability to complete a transaction. As further described below with reference to FIG. 3, these models may include one or more logistic regression models, neural networks, and/or any other model that can weigh the effect of certain attributes.

Incrementality System 104 may store user characteristic information and user interaction information (e.g. based on information received from User Device 103 and/or one or more platforms of Advertising Channels and Publishers 107) for each user. Incrementality System 104 may associate user characteristic information with a user identifier. User interaction information may include clicks, impressions, and/or user transaction information for each user (e.g. completed product purchase, product added to cart etc.), based on information received from User Device 103 and/or one or more platforms of Advertising Channels and Publishers 107. Incrementality System 104 may associate the user transaction information with a user identifier, and/or other user interaction information in a time period leading up to the transaction, as further detailed below with reference to FIG. 2. In some embodiments, a Company Device 102 may set the time period for user interactions to be associated with a user transaction.

The Incrementality System 104 may store weight information for one or more advertising channels and/or publishers based on the impact advertisements on the advertising channels and/or publishers has on a user's probability to complete a transaction (e.g. make a purchase, add an item to a cart etc.). Incrementality System 104 may store the user characteristic information, user interaction information, and/or user weight information in one or more formats (e.g. searchable tables) and/or data types (csv, json etc.) that allow for access by the Advertising Evaluation System 101 to perform one or more evaluation processes. Further, the Incrementality System 104 may store instructions for performing one or more evaluation processes. For example, Incrementality System 104 may store instructions for performing one or more of the processes detailed below with reference to FIG. 3.

Marketing Analysis System 105 may include one or more systems that allow for a company to determine the effectiveness of an advertising campaign and make changes to an advertising campaign. Marketing Analysis System 105 may store information required to evaluate the effectiveness of an advertising campaign. For example, Marketing Analysis System 105 may store threshold goals for one or more advertising channels and/or publishers (e.g. a threshold amount of transactions apportioned to an advertising channel and/or publisher, a threshold purchase money spent apportioned to an advertising channel and/or publisher).

Marketing Analysis System 105 may change threshold values based on input from Company Device 102 and/or automatically based on Marketing Analysis System 105 averaging a performance of advertisement campaigns. For example, Marketing Analysis System 105 may set an average number of purchases as a threshold, may set an average number of items added to cart as a threshold, and/or may set a purchase money spent as a threshold. Marketing Analysis System 105 may set an average number of transactions apportioned to an advertising channel as a threshold and/or may set an average purchase money apportioned to an advertising channel as a threshold. Marketing Analysis System 105 may set an average number of transactions apportioned to a publisher as a threshold and/or may set an average purchase money apportioned to a publisher as a threshold. Further, the Marketing Analysis System 105 may store instructions for performing one or more evaluation processes. For example, Marketing Analysis System 105 may store instructions for performing one or more of the processes detailed below with reference to FIG. 4.

Monitoring System 106 may include one or more systems that allow a company to monitor the effectiveness of advertising channels and/or publishers and to make changes to the models and/or weights used by Incrementality System 104 to apportion a purchase. The Monitoring System 106 may store one or more parameters for testing the effectiveness of advertising channels and/or publishers. In some embodiments, these parameters may be specific to an advertising channel and/or publisher to be tested. For example, the stored one or more testing parameters may be associated with one or more advertising channels and/or publishers to which they apply.

Testing parameters may include one or more timing parameters indicating a time period for testing the advertising channel and/or publisher. For example, testing parameters may include one or more of: parameters that indicate a period of time advertising will be turned on and a period of time that advertising will be turned off, parameters that indicate a period of time advertising will not be reduced and a period of time that advertising will be reduced, or parameters that indicate a period of time advertising spending will not be reduced and a period of time that advertising spending will be reduced. In some embodiments, the monitoring performed by Monitoring System 106 may include testing the effectiveness of the advertising channel and/or publisher by repeating the above time periods for a second period of time stored by the Monitoring System 106. In other embodiments, the monitoring performed by Monitoring System 106 is performed continuously unless a command is sent via Company Device 102 to stop the monitoring.

Testing parameters may further include one or more quantity parameters indicating an amount of advertising that will be affected. For example, testing parameters may include: a parameter that indicates a portion of advertising that will be turned off, a parameter that indicates a portion of advertising that will remain on, a parameter that indicates a portion of advertising spending that will be removed, a parameter that indicates a portion of advertising spending that will remain, a parameter that indicates a portion of a plurality of users that will receive advertising that is not reduced and a portion of the plurality of users that will receive reduced advertising, or a parameter that indicates a portion of a plurality of users that will receive advertising and a portion of the plurality of users that will not receive advertising. Further, the Monitoring System 106 may store instructions for performing one or more evaluation processes. For example, Monitoring System 106 may store instructions for performing one or more of the processes detailed below with reference to FIG. 5.

Advertising Evaluation System 101 may communicate directly and/or indirectly, through wired or wireless communication, with User Device 103, Company Device 102, and/or Advertising Channels and Publishers 107. In some embodiments, Advertising Evaluation System 101 may communicate with User Device 103 to receive user interactions. For example, one or more platforms of Advertising Channels and Publishers 107 may install click or impression trackers on their platform that are coded in a manner that allow user interaction information (e.g. impressions, clicks, channel identifier, publisher identifier, advertisement campaign identifier, transaction information) to be sent directly to Advertising Evaluation System 101. In some embodiments, Advertising Evaluation System 101 may communicate with User Device 103 to receive user characteristic information. For example, one or more platforms of Advertising Channels and Publishers 107 may code their interface in a manner that allows for user characteristic information to be directly sent to Advertising Evaluation System 101.

In some embodiments, Advertising Evaluation System 101 may communicate with Company Device 102 to provide evaluation information and/or set advertisement parameters. In some embodiments, Advertising Evaluation System 101 may be part of Company Device 102. In some embodiments, Advertising Evaluation System 101 may communicate with Advertising Channels and Publishers 107. For example, instead of directly collecting user characteristic information and/or user interactions from User Device 103, Advertising Evaluation System 101 may receive that information through communications with one or more platforms of Advertising Channels and Publishers 107.

Advertising Evaluation System 101, including Incrementality System 104, Marketing Analysis System 105, and Monitoring System 106, may include one or more computer systems, including at least one processor (such as an x86 or x64 compatible processor) and at least one memory storage device (such as flash memory). Further, Advertising Evaluation System 101, including Incrementality System 104, Marketing Analysis System 105, and a Monitoring System 106, may communicate with additional systems, platforms, databases, and/or cloud storage centers (not shown) to store threshold information, parameter information, user characteristic information, user transaction information, weights, and/or to perform any function of the disclosed embodiments.

User Device 103 may include one or more computers, laptops, tablets, mobile phones, smart phones, PDAs, or any other computerized system that allows for a consumer to interact with advertising content. User Devices 103 may receive and display advertisements to a user (e.g. by launching a platform from Advertising Channels and Publishers 107). In some embodiments, a user may be a customer of a company associated with Company Device 102, while in other embodiments the user may not be a customer of the company. In some embodiments, User Device 103 may track user characteristic information and/or user interactions and may provide that information to Advertising Channels and Publishers 107 and/or to Advertising Evaluation System 101. For example, a User Device 103 may track characteristic information about a user based on the user selecting different characteristics that they identify with. For example, a user may make selections on the platform indicating their gender, age, location, company membership status of a company associated with Company Device 102, selections on product interest surveys, and/or events the user selected as having attended. Further, Advertising Evaluation System 101 may derive user characteristic information from user activity on the User Device 103. For example, a User Device 103 may include one or more applications for collecting and/or distributing user characteristic information based on information received from one or more platforms that include trackers. Similarly, User Device 103 may include one or more applications for collecting and/or distributing user interaction information based on information received from one or more platforms that include trackers. The trackers may include impression or click trackers, as described above.

User Device 103 may communicate directly and/or indirectly, through wired or wireless communication, with Advertising Evaluation System 101 and/or Advertising Channels and Publishers 107. In some embodiments, User Device 103 may send user characteristic information and/or user interaction information to Advertising Channels and Publishers 107 and/or Advertising Evaluation System 101. In some embodiments, all the user characteristic information received by User Device 103 is provided to Advertising Channels and Publishers 107 and/or Advertising Evaluation System 101. In some embodiments, User Device 103 may provide a portion of the user characteristic information to Advertising Channels and Publishers 107 and/or Advertising Evaluation System 101. For example, the portion of user characteristic information sent by User Device 103 may be based on user privacy selections on the platform and/or privacy regulations.

Further, User Device 103 may allow for a consumer to perform a transaction (e.g. purchase a product). The User Device 103 may display a webpage including details on the product and/or options for purchasing the product (e.g. webpage from Company Website 121). For example, User Device 103 may allow a user to click on or otherwise interact with a user interface element to initiate the purchase of a product (e.g. add it to a cart). User Device 103 may track and/or transmit information associated with a transaction to Advertising Evaluation System 101 and/or Advertising Channels and Publishers 107. In some embodiments, this information is transmitted as part of the user interaction information.

Figure 2A:
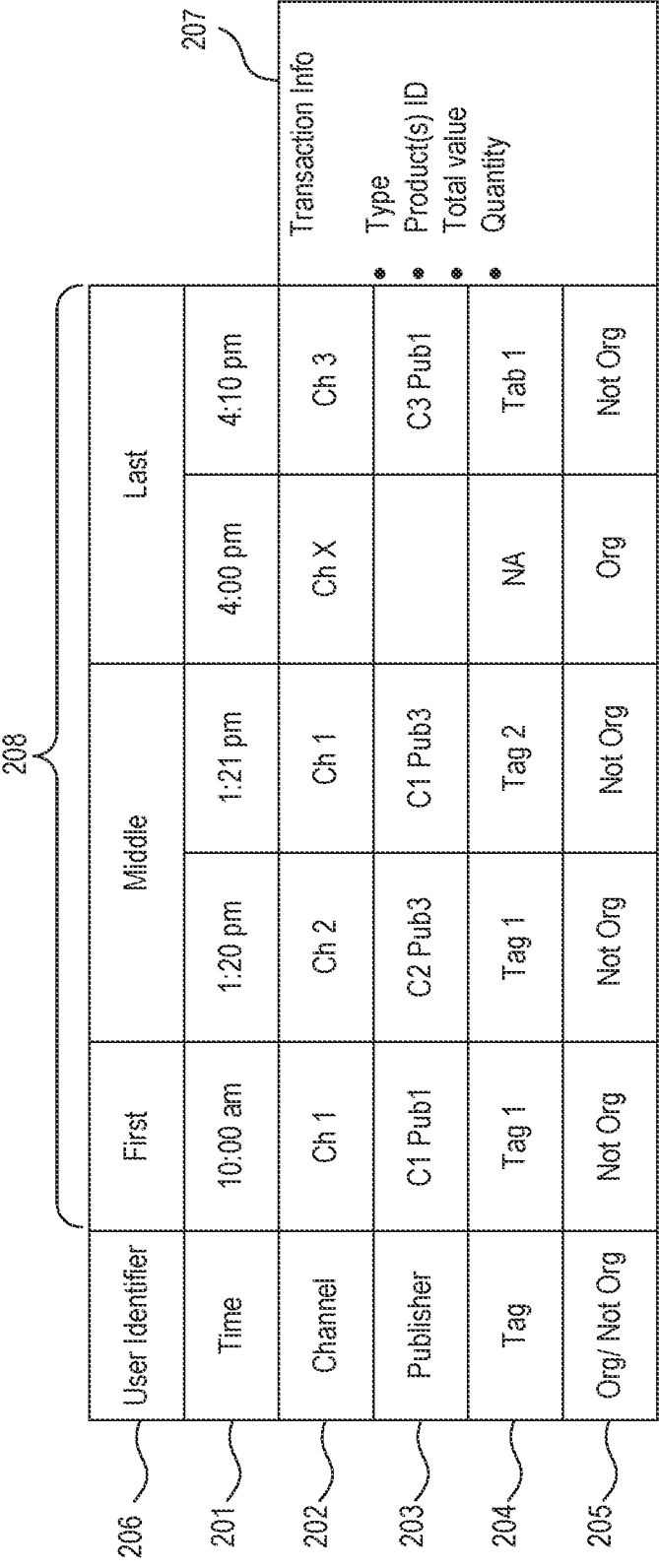
FIG. 2A depicts a table of tracking user interactions across advertising channels and/or publishers, consistent with the disclosed embodiments.

Referring to FIG. 2A, illustrating a table of tracking user interactions across advertising channels and/or publishers, consistent with the disclosed embodiments. As described above, one or more systems may track user interactions (e.g. including, tracked clicks, impressions, transaction information) with one or more advertising channels and/or publishers. For example, the information shown in FIG. 2A may be stored in Incrementality System 104 for tracking user interactions. As described above, the one or more systems may track the user interactions for a window of time leading up a transaction (e.g. purchase, add to cart). The tracked user interaction information may include a user identifier 206 associated with the user. Therefore, user interactions by the same user across multiple user devices can be associated with the same user. The tracked user interaction information may include a time of the interaction 201. For example, the system may record a time of a click on an advertisement or impression of an advertisement. The time may include a date and time of day and/or a time in relation to an end transaction 106 (e.g. 1.5 hr before transaction). For example, leading up to the transaction, the user interacted with advertisements at 10:00 am, 1:20 pm, 1:21 pm, and 4:10 pm. Further, the one or more systems may record the time of visiting a company website, even if there is no interaction with advertising. For example, the user interacted with the company website at 4:00 pm.

Further, the one or more systems may associate each user interaction with a Channel 202 where that interaction took place. For example, the one or more systems may associate a first interaction with a first channel identifier, Ch 1, and the one or more systems may associate a second interaction with a second channel identifier, Ch 2. As described above, a company may decide to track multiple publishers together and assign them the same channel identifier. Further, the one or more systems may associate each user interaction with a Publisher 203 where that interaction took place. For example, a first interaction may be associated with a first publisher of a first channel, C1 Pub1, and a second interaction may be associated with a third publisher of second channel, C2 Pub3. In some embodiments (as shown), the publisher identifiers may identify the channel that the publisher is publishing within, while in other embodiments the publisher identifier may not reference any channel.

Further, the one or more systems may associate each user interaction with a Campaign Tag 204. Company Device 102 may create the Campaign Tag 204 to track an advertisement (e.g. a communication), thereby creating a tracked advertisement (e.g. a tracked communication). In some embodiments, the Campaign Tag 204 may indicate information about the advertisement that the user interacted with. The Campaign Tag 204 may indicate information about the content displayed in the advertisement, such as an information on an image used in the advertisement, information on a product type advertised, information on the type of product description, information on the price description, and/or information on the sale description. The campaign tag may indicate information about the type of user being targeted, such as an age range of users being targeted and/or a gender of users being targeted. In some embodiments, Company device 102 may assign identifiers for Channel 202, Publisher 203, and Campaign Tag 204. In some embodiments, one or more platforms may assign the identifiers and a company system (e.g. Advertising Evaluation System 101) may execute instructions to convert the identifiers into a common channel or publisher identifier used across platforms.

Further, the one or more systems may identify each user as an organic interaction or a non-organic interaction 205. In some embodiments, a non-organic interaction is an interaction with an advertisement and/or an interaction that results from an interaction with an advertisement. In some embodiments, an organic interaction is an interaction with a company webpage that did not result from interacting with an advertisement. For example, the one or more systems may label each of the user interactions with advertisements at 10:00 am. 1:20 pm, 1:21 pm, and 4:10 pm to indicate they are non-organic interactions. Further, as shown, the one or more systems may label the user interaction(s) on the company website 121 at 4:00 pm to indicate it is an organic interaction. In some embodiments, organic v. non-organic interactions may not be identified separately. Instead, the one or more systems may determine an action to be organic or non-organic based on a different identifier (e.g. a channel identifier).

Further, the one or more systems may group each user interaction into a category for weighting based on the time of the user interaction leading up to a transaction. In some embodiments, user interactions may be placed in categories for weighting based on the time they occurred leading up to a purchase. For example, in some embodiments, the one or more systems may categorize user interactions into two, three, four, or more buckets based on the time of the user interaction. In some embodiments, each bucket may include the same time window, while in other embodiments each bucket may include differing time windows. For example, the user interaction at 10:00 am is categorized in a first time window, the user interactions at 1:20 pm and 1:21 pm are categorized in a second time window, the user interactions at 4:00 pm and 4:10 pm are categorized in a third time window. As described above, user interactions closer to the transaction may be weighted more heavily.

Further, user interactions may include transaction information 207 received from one or more systems, as described above. For example, transaction information 207 may include one or more of a type of transaction (e.g. a purchase, adding to cart etc.), a product identifier, a total value of the products, and a quantity of products. For example, the type of transaction may be a purchase, the product identifier may be a number and/or text description of a sweater, the total value of the sweater may be $15, and the quantity may be one. The user interactions may include one or more of: only clicks, only impressions, or a combination of clicks and impressions. While the table shown in FIG. 2*a* shows one way of associating user interaction data, the data can be associated in many different formats. User interaction data can be stored in any format that allows for linking the user interactions with one or more of: time, channel ID, publisher ID, campaign tag, and transaction information.

Referring to FIG. 2B, illustrating a table of weighting user interactions across advertising channels and/or publishers based on proximity to a transaction, consistent with the disclosed embodiments. As described above, one or more systems may track user interactions with one or more advertising channels and/or publishers. For example, the information shown in FIG. 2B may be stored in Incrementality System 104 for tracking user interactions. In some embodiments, all the user interactions within a category 208 may equal a set value that is even across all categories. The set value may be apportioned evenly based on the user interactions on a channel and/or publisher that take place in each category 208. As shown in FIG. 2B, two user interactions occur in middle category on a first and second channel so the interactions are apportioned evenly between a first channel, Ch 1, and a second channel, Ch 2. The set value is 1, so each Channel receives 0.5 of the set value of 1. However, the set value could be any value and each channel would receive half of the set value. As another example (not shown), within a category, a user may interact with a first channel once, a second channel twice, and a third channel once. If the set value is one, the value would be apportioned so that the first channel Ch 1 receives 0.25, the second channel Ch 2 receives 5, and the third channel Ch 3 receives 0.25.

Further, the one or more systems may apportion the user interactions with publishers. As shown in FIG. 2B, two user interactions occur in middle category on a third publisher of a first channel C1 Pub3 and a third publisher of a second channel C2 Pub 3, so the interactions are apportioned evenly between the third publisher of a first channel C1 Pub3 and the third publisher of a second channel C2 Pub 3. The set value is 1, so each publisher receives 0.5 of the set value of 1. However, the set value could be any value and each publisher would receive half of the set value. Further, the one or more systems may apportion the user interactions with advertising campaigns. As shown in FIG. 2B, two user interactions occur in a middle category associated with a first campaign tag 1 and a second campaign tag 2, so the interactions are apportioned evenly between the first campaign tag 1 and the second campaign tag 2.

Further, in some embodiments, the one or more systems may weight each apportioned value. The one or more systems may assign each category a weight 209 and the one or more systems may multiply the apportioned value by the weight. In some embodiments, each apportioned value associated with a channel, publisher, and/or campaign tag will be weighted and summed together. In some embodiments, the one or more systems may weight categories of user interactions closer to a transaction more heavily than user interactions that are further from the transaction. For example, as shown in FIG. 2B, the first category is assigned a weight of 0.13, the second category is assigned a weight of 0.27, and a third category is assigned a weight of 0.6. Therefore, summing the weighted apportion values for each channel returns a value of 0.265 associated with Channel 1, Ch 1, a value of 0.135 associated with Channel 2, Ch 2, and a value of 0.6 associated with Channel 3, Ch 3. Similarly, summing the weighted apportion value for each publisher returns a value of 0.13 associated with Channel 1 Publisher 1, a value of 0.135 associated with Channel 1 Publisher 3, a value of 0.135 associated with Channel 2 Publisher 3, and a value of 0.6 associated with Channel 3 Publisher 1. Similarly, summing the weighted apportioned value for each campaign tag returns a value of 0.865 for campaign tag 1 and 0.135 for campaign tag 2.

While the above description describes a process that splits user interactions into categories and apportions them to sum to a set value within each category, the invention is not so limited. In some embodiments, the user interactions are not apportioned within a category and/or are not weighted. In some embodiments, each user interaction may have an identical value and the weight given to the user interaction may vary based on the time or order of the interaction in relation to a user transaction (e.g., closer in time to a user transaction may receive a higher weight) without categories.

Figure 3:
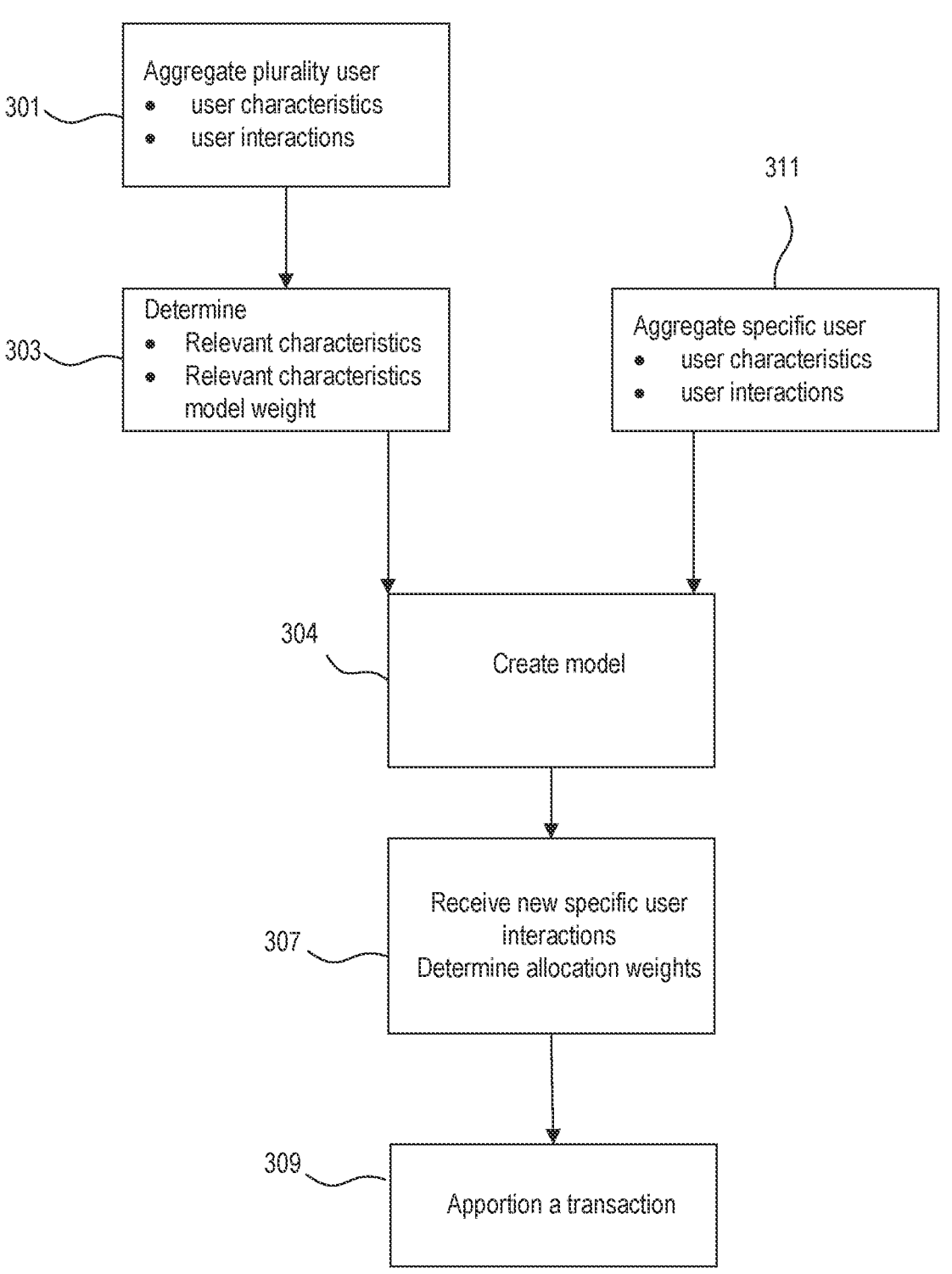
FIG. 3 illustrates a flow chart for apportioning a transaction, consistent with the disclosed embodiments.

Referring to FIG. 3, illustrating a flow chart for apportioning a transaction, consistent with the disclosed embodiments. In some embodiments, the process of FIG. 3 is performed by Incrementality System 104, while in other embodiments one or more steps of the process in FIG. 3 may be executed by another device (including, e.g., Advertising Channels and Publishers 107, User Device 103, and/or Company Device 102).

At Step 301, the system aggregates user characteristic information and/or user interactions, as described above. For example, the system stores user characteristic information and/or user interactions from a plurality of users. User interaction information may include transaction information (e.g. purchases made, products added to cart etc.).

At Step 303, the system may determine which characteristics from the aggregated user characteristic information are relevant. For example, the system may determine a number of relevant characteristics.

A company, through Company Device 102, may set the number of relevant characteristics and/or the system may determine the number of relevant characteristics based on how many characteristics meet a threshold level of impact on a user's probability of completing a transaction. For example, determining relevant characteristics may include selecting user characteristics whose value makes a transaction more or less likely. For example, determining relevant characteristics may include selecting user characteristics whose value impacts the probability of a user completing a transaction by a set threshold (e.g. 2%, 5%, 10%, 15%, 20%). In some embodiments, relevant user characteristics are set by the company (e.g. on Company Device 102). In some embodiments, relevant user characteristics may include one or more of: a membership status in a company program, a purchasing status of the user, a recency, frequency, monetary value (RFM) status of the user, an age of the user, or a gender of the user.

After determining the relevant characteristics, the system may determine the weight of each of the relevant characteristics. In some embodiments, the system may determine the weight of each relevant characteristic using a logistic regression model. A logistic regression model may be a statistical model that estimates the relationship between a response and one or more variables.

In some embodiments, the system may represent user transaction information aggregated in Step 301 with a binary value (e.g., 0 or 1), indicating whether a transaction was completed (e.g., purchase made, item added to cart etc.) or not completed (e.g., no purchase made, no item added to cart etc.). The logistic regression model may represent a probability of transaction completion based the values for transaction completion (e.g., 0 or 1) and the values of the associated relevant characteristics.

$$\text{Probability of Transaction Completion} = f(Y)$$

$f(Y)$ is a logical regression function including a linear component $Y$ $Y = \text{intercept} + aa * \text{characteristic 1 value} +$
$$bb * \text{characteristic 2 value} + cc * \text{characteristic 3 value}$$

$$\text{characteristic values (e.g., 1, 2, 3)}$$

$$\text{represent the values of the relevant characteristics}$$

The system may determine the weight of the relevant characteristics (e.g., aa, bb, and cc) that give the best fit to the data, including the values for transaction completion (e.g., 0 or 1) and the associated relevant characteristic values. In some embodiments, the weights of the relevant characteristics (e.g., aa, bb, and co) may be the same across all users.

At Step 311, the system may aggregate user characteristic information and user interaction information for a specific user. For example, the system may determine user characteristic values for the relevant characteristics determined in Step 303. For example, the system stores user characteristic information and/or user interactions for the user collected over time (e.g, over a time window). Further, in some embodiments, the system may aggregate information associated with the user's transactions (e.g. click data, impression data, transaction data etc.). In some embodiments, the user's interaction information may include the information shown in FIG. 2A-FIG. 2B. For example, user interaction information may include user interactions that are apportioned and/or weighted as shown by the values of FIG. 2B results column 210.

At Step 304, the system may create a model that represents the impact of user interactions and user characteristics on a probability of completing a transaction. In some embodiments, the model may be a logistic regression model. In some embodiments, the system may represent user transaction information aggregated in Step 311 with a binary value (e.g., 0 or 1), indicating whether a transaction was completed (e.g., purchase made, item added to cart etc.) or not completed (e.g., no purchase made, no item added to cart etc.). The logistic regression model may represent a probability of transaction completion based on the values for transaction completion (e.g., 0 or 1), the values of the channel interactions, the values of the associated relevant characteristics, and the values of past interactions.

$$\text{Probability of Transaction Completion} = f(Y)$$

f( )Y) is a logistic regression function including a linear component Y $$Y = \text{intercept} + a * \text{channel 1 interaction value} +$$
$$b * \text{channel 2 interaction value} + c * \text{channel 3 interaction value} +$$
$$aa * \text{characteristic 1 value} + bb * \text{characteristic 2 value} +$$
$$cc * \text{characteristic 3 value} + aaa \text{ past channel 1 interaction value} +$$
$$bbb \text{ past channel 2 interaction value} +$$
$$ccc \text{ past channel 3 interaction value.}$$

characteristic values (e.g., 1, 2, 3) represent the values of the relevant characteristics;

channel interaction values (e.g., 1, 2, 3) represent the user interactions on each channel;

past channel interaction values (e.g., 1, 2, 3) represent the past user interactions on each channel;

The system may determine the weight of the user interactions (e.g., a, b, and c) that give the best fit to the data, including the values for transaction completion (e.g., 0 or 1), the values of the channel interactions, the values of the associated relevant characteristics, and the values of past user interactions.

In some embodiments, the user interaction values used in the logistic regression model are the apportioned and/or weighted values from FIG. 2B. For example, channel 1 interaction value may be 0.265, channel 2 interaction value may be 0.135, and channel 3 interaction value may be 0.6. Further, the user interaction values inputted into the equation may exclude organic interactions. The user interaction weights for past interactions (e.g. aaa, bbb, ccc) may be past solutions to the logistic regression model and/or may be set by a company (e.g. through Company Device 102). The system may track past interactions for a period of time set by a company (e.g. through Company Device 102). For example, in some embodiments, past interactions may be tracked for the last 30 days.

At Step 307, the system may receive new specific user interactions and determine the channel allocation model weights (e.g., A,B,C) using the above logistic regression model. The new specific user interaction information may include the information shown in FIGS. 2A-2B. For example, user interaction information may include user interactions that are apportioned and/or weighted as shown by the values of FIG. 2B results column 210. The user interaction information may further include information about a transaction. For example, in some embodiments, the transaction may be a purchase, and the transaction information may include a price for the purchase, a quantity of products included in the purchase, a revenue made by the purchase, and/or a profit made by the purchase. In some embodiments, the transaction may include adding products to a cart, and the transaction information may include a price of products in the cart and/or a quantity of products included in the cart. In some embodiments, the transaction may include entering payment information for products, and the transaction information may include a price of products who have payment information added and/or a quantity of products that have payment information added.

In some embodiments, the system may calculate the removal effect for each channel. For example, the system may remove a contribution from channel 1 interactions (e.g., α*channel 1 interaction value) from the logistic regression model. The system may determine the impact to the probability of completing a transaction as the removal effect of channel 1. After determining the removal effect of each channel, the system may calculate a relative removal effect for each channel. For example, the relative removal effect of channel 1 may be represented by the below equation:

$$\text{Relative removal effect of channel 1} =$$
$$\frac{\text{removal effect of channel 1}}{\begin{array}{c}\text{removal effect of channel 1} + \\ \text{removal effect of channel 2} + \text{removal effect of channel 3}\end{array}}$$

Further, in some embodiments, the system may calculate a total contribution of all non-organic factors. For example, the system may remove the contribution from all channel interactions (e.g., α*channel 1 interaction value, b*channel 2 interaction value+c*channel 3 interaction value) and determine the impact to the probability of completing a transaction as the total contribution of all non-organic factors. In some embodiments, the impact to the probability of completing a transaction may be a proportional impact. For example, if the logistic regression predicts 50% probability of transaction completion with non-organic interactions included and 30% probability of transaction completion with non-organic organic interactions removed, the total contribution of all non-organic interactions may be 40%. Further, in some embodiments, the system may multiply the relative removal effect for each channel by the total contribution of all non-organic interactions to determine the allocation weights (e.g., A, B, C) for each channel.

Similarly, in some embodiments, the system may determine allocation model weights for allocating a transaction to one or more publishers using a logistic regression model.

$$\text{Probability of Transaction Completion} = f(Y)$$

f(Y) is a logistic regression function including a linear component Y $$Y = \text{intercept} + a * \text{publisher 1 interaction value} +$$
$$b * \text{publisher 2 interaction value} + c * \text{publisher 3 interaction value} +$$
$$d * \text{publisher 4 interaction value} + aa * \text{characteristic 1 value} +$$
$$bb * \text{characteristic 2 value} + cc * \text{characteristic 3 value} +$$
$$aaa * \text{past publisher 1 interaction value} +$$
$$bbb * \text{past publisher 2 interaction value} +$$
$$ccc * \text{past publisher 3 interaction value} +$$
$$ddd * \text{past publisher 4 interaction value.}$$

characteristic values (e.g., 1, 2, 3) represent the values of the relevant characteristics;

publisher interaction values (e.g., 1, 2, 3, 4) represent the user interactions on each publisher;

past publisher interaction values (e.g., 1, 2, 3, 4) represent the past user interactions on each publisher;

As in determining allocation weights for one or more channels, in some embodiments, the user interaction values used in the publisher logistic regression model are the apportioned and/or weighted values from FIG. 2B. For example, publisher 1 interaction value may be 0.13, publisher 2 interaction value may be 0.135, publisher 3 interaction value may be 0.135, and publisher 4 interaction value may be 0.6. The user interaction values and channels may exclude organic interactions. Past interactions may be determined in the same manner(s) as past interactions in the logistic regression model for channel allocation. The system may determine the publisher allocation model weights (e.g., A, B, C, D) using the above logistic regression model. As described above, the publisher allocation weights may be determined by multiplying a relative removal effect for each publisher by the total contribution of all non-organic interactions to determine the allocation weights (e.g., A, B, C, D) for each publisher.

At Step 309, the system may allocate user transactions between one or more channels by weighting the transaction value by the allocation model weight. In some embodiments, the apportioned transaction value for a first channel may equal A*transaction amount. Similarly, in some embodiments, the apportioned transaction value for a second channel may equal B*transaction amount. Similarly, in some embodiments, the apportioned transaction value for a third channel may equal C*transaction amount. In some embodiments, after apportioning the transaction to each channel, the system may assign a remaining value of the transaction as not attributable to advertising.

In some embodiments, the apportioned transaction value for a first publisher may equal A*transaction amount. Similarly, in some embodiments, the apportioned transaction value for a second publisher may equal B*transaction amount. Similarly, in some embodiments, the apportioned transaction value for a third publisher may equal C*transaction amount. Similarly, in some embodiments, the apportioned transaction value for a fourth publisher may equal/*transaction amount. In some embodiments, after allocating the transaction to each publisher, the system may assign a remaining value of the transaction as not attributable to advertising. As described with respect to Step 307, the transaction amount may include a price, quantity of products, revenue, or profit. The allocation is more accurate than allocations by existing systems because it is based on a determined relationship between transaction probability and user interactions on each channel and user characteristics.

The process detailed above provides an example of using one or more logistic regression models to determine the characteristic model weight at Step 303 and to determine the allocation model weight at Steps 304 and 307, but the disclosure is not so limited. The system may use any type of model to determine the user characteristic model weight and/or the allocation model weight. In some embodiments the system may use a neural network to perform at least one of the above steps. The neural network may comprise an input layer, one or more hidden layers, and an output layer. For example, the system may use a neural network to determine the relevance and impact of one or more user characteristics. The neural network may receive user characteristic values for a plurality of users. As described above, user characteristics may include membership status in a company program, a purchasing status of the user, a recency, frequency, monetary value (RFM) status of the user, an age of the user, gender of the user, or any other user characteristic. Further, the neural network may receive information on transactions completed by the plurality of users (including, e.g. whether they completed a transaction in a set time period). In some embodiments, the neural network may include a number of nodes corresponding to the number of user characteristic types inputted. Based on processing the characteristic data and corresponding transaction information, the neural network may determine the weight each user characteristic has on a probability of completing a transaction.

Similarly, the system may use a neural network to determine the impact of user interaction on one or more channels or publishers. The neural network may receive the user interactions for a user. As described above, user interactions may include impressions and/or clicks on advertising posted in one or more channels and/or publishers as shown in FIG. 2a. Further, the neural network may receive information on transactions completed by a user (including, e.g. whether they completed a transaction in a time period). The neural network may include a number of nodes corresponding to the number of channels or publishers being tracked. Based on processing the user interaction data and corresponding transaction information, the neural network may determine the weight each user interaction on a channel or publisher has on a probability of completing a transaction. In some embodiments, the system may use a single neural network to evaluate both user characteristic information and user interactions.

Figure 4:
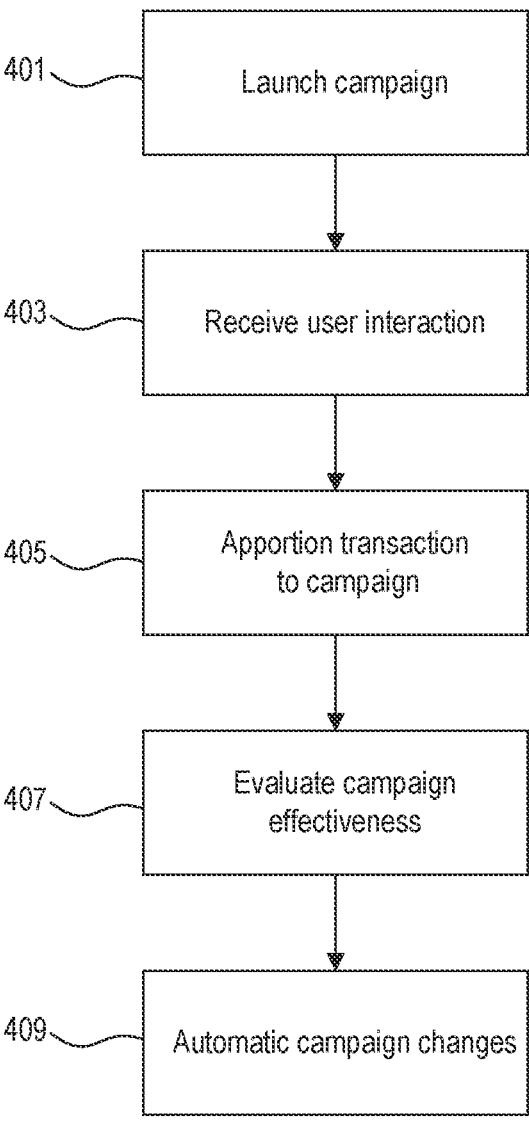
FIG. 4 illustrates a flow chart for determining marketing effectiveness, consistent with the disclosed embodiments.

Referring to FIG. 4, illustrating a flow chart for determining marketing effectiveness, consistent with the disclosed embodiments. In some embodiments, the process of FIG. 4 is performed by Marketing Analysis System 105, while in other embodiments one or more steps of the process in FIG. 4 may be executed by another system (including, e.g., Incrementality System 104 and/or Monitoring System 106). At Step 401, the system may launch an advertisement campaign across multiple advertising channels and/or publishers. For example, a company may assign advertisement content a campaign tag (e.g. Tag 1, Tag 2 in FIG. 2B) and provide the the the advertisement content for display across multiple advertising channels and/or publishers.

At Step 403, the system may receive a user interaction with advertising (e.g., a click or impression). In some embodiments, the user interaction information may include some or all of the information shown in FIG. 2A-FIG. 2B. For example, user interaction information may include user interactions that are apportioned and/or weighted as shown by the values of FIG. 2B results column 210. The user interaction information may further include information about a transaction. For example, in some embodiments, the transaction may be a purchase, and the transaction information may include a price for the purchase, a quantity of products included in the purchase, a revenue made by the purchase, and/or a profit made by the purchase. In some embodiments, the transaction may include adding products to a cart, and the transaction information may include a price of products in the cart and/or a quantity of products included in the cart. In some embodiments, the transaction may include entering payment information for products, and the transaction information may include a price of products who have payment information added and/or a quantity of products that have payment information added.

At Step 405, the system may apportion the transaction amount. In some embodiments, this may include performing the apportioning process of FIG. 3 for one or more channels and/or publishers. For example, a transaction price may be $100 and $10 may be due to interactions on channel 1. In some embodiments, this may include apportioning the transaction amount across all channels and/or publishers associated with the campaign tag. For example, a transaction price may be $100 and $70 is due to interactions with advertisements with campaign Tag 1 across all channels and/or publishers. In some embodiments, this may include apportioning the transaction amount to a channel or publisher and the campaign tag. For example, a transaction price may be $100, an amount apportioned to channel 1 may be $10, and an amount apportioned to advertisement campaign Tag 1 on channel 1 may be $5. In some embodiments, the apportioned amounts may be aggregated for a plurality of users. Further, for each of the above transaction apportionments, in some embodiments, the apportioned amount will exclude a portion of the transaction that is not the result of advertising.

At Step 407, the system may evaluate campaign effectiveness. In some embodiments this may include comparing the apportioned transaction amount to one or more thresholds. In some embodiments, the threshold may be a goal transaction amount apportioned to a campaign tag across all channels and/or publishers. Further, determining the advertising campaign effectiveness may include determining a campaign is effective if the amount apportioned to the campaign tag is at or over the threshold amount. In some embodiments, the threshold amount may be a goal transaction amount apportioned to a campaign tag and a particular channel or publisher identifier. Further, determining the advertising campaign effectiveness may include determining a campaign is effective if the amount apportioned to the campaign tag and the channel or publisher identifier is at or above the threshold amount. In some embodiments, multiple thresholds may correspond to a goal transaction amount apportioned to the campaign tag and each channel and/or publisher. Further, determining the advertising campaign effectiveness may include determining a campaign is effective if the amount apportioned to the campaign tag and each channel or publisher identifier is above its corresponding threshold.

In some embodiments, a threshold amount may be an amount apportioned to a second channel and/or publisher. Further, determining the advertising campaign effectiveness may include determining a campaign is effective if the amount apportioned to the campaign tag (or to a channel or publisher and the campaign tag) is at or above an amount apportioned to a second campaign tag (or to the corresponding channel or publisher and the second campaign tag). In the above evaluations, if the advertising campaign may be determined to be ineffective if it does not meet the requirement(s) for effectiveness (e.g., because it does not meet the one or more threshold requirements listed above).

At Step 409, the system may make advertising campaign changes based on the results of the evaluation performed at Step 407. In some embodiments, the system may make these advertising campaign changes automatically. In some embodiments, the system may automatically prompt the company and/or platform to make suggested changes. For example, the system may generate and send notifications in the form of emails, push notifications, SMS notifications, and/or MMS notifications, providing information on advertising changes that should be made. The system may send notifications to Company Device 102 and/or Advertising Channels and Publishers 107.

In some embodiments, the effectiveness of an advertising campaign on a publisher of a search channel may be evaluated in Step 407 and, based on the campaign being determined ineffective on the search channel publisher, the system may automatically select new keywords that prompt the advertising campaign content. For example, the system may automatically select a next set of keywords from a stored memory or database of keywords. The system may further send the new keywords to the search channel publisher or send code incorporating the new keywords to the search channel publisher. In some embodiments, the system may automatically include the new keywords in the search platform. In some embodiments, they system may provide a notification to the company and/or search channel publisher indicating the keywords need to change and/or providing the new set of keywords.

In some embodiments, the system may evaluate the effectiveness of an advertising campaign on a channel in Step 407 and, based on the campaign being ineffective on the channel, the system may automatically remove the advertising campaign content from that channel and/or may provide a notification indicating that the advertising campaign is ineffective on the channel. In some embodiments, the system may evaluate the effectiveness of an advertising campaign on a publisher in Step 407 and, based on the campaign being ineffective on the publisher, the system may automatically remove the advertising campaign content from the publisher and/or may provide a notification indicating that the adverting campaign is ineffective on the publisher platform.

In some embodiments, the system may evaluate the effectiveness of an advertising campaign across all channels and publishers in Step 407 (including, e.g. each channel and/or publisher being compared to a threshold or an overall transaction amount being compared to a threshold) and, based on the campaign being ineffective, the system may automatically stop the advertising campaign, switch the advertising campaign content, and/or may provide a notification indicating that the advertising campaign is ineffective.

Figure 5:
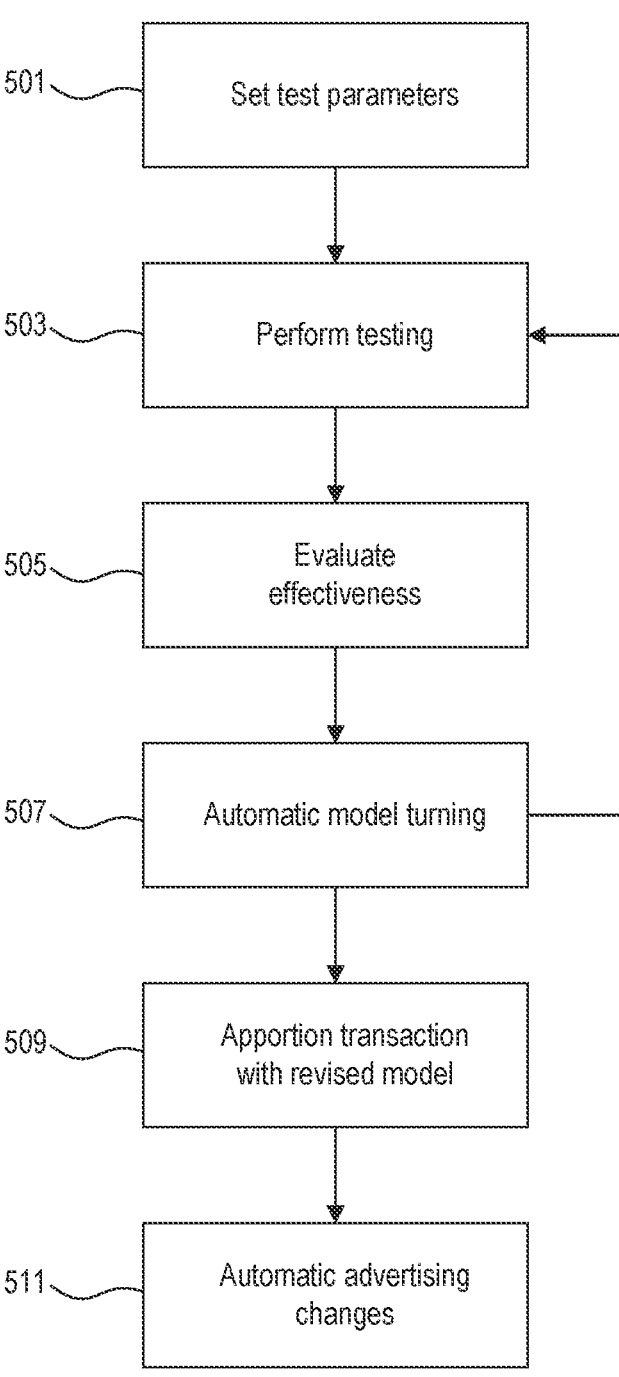
FIG. 5 illustrates a flow chart for continuous incrementality monitoring, consistent with the disclosed embodiments.

Referring to FIG. 5, illustrating a flow chart for continuous incrementality monitoring, consistent with the disclosed embodiments. In some embodiments, the process of FIG. 5 is performed by Monitoring System 106, while in other embodiments one or more steps of the process in FIG. 5 may be executed by another system (including, e.g., Incrementality System 104 and/or Marketing Analysis 105). At Step 501, the system may set test parameters. In some embodiments, the test parameters may be specific to a channel or publisher. As described above, test parameters may include one or more timing parameters indicating a period of time for testing the advertising on a channel or publisher by repeatedly turning at least some advertising on and then off for the channel or publisher. As described above, test parameters may further include one or more quantity parameters indicating an amount of advertising that will be effected (including, e.g. a portion of advertising that will be removed, campaign tags associated with advertising that will be removed, and/or a portion of users that will not receive advertising).

At Step 503, the system may perform testing of one or more advertising channels and/or publishers based on the testing parameters set in Step 501. Testing the advertising channels and/or publishers may include automatically making the changes to advertising according to the testing parameters.

At Step 505, the system may evaluate the publisher and/or channel effectiveness. In some embodiments, this may include comparing a total transaction value when advertising was reduced to a total transaction value when advertising was not reduced. Therefore, the system may estimate an overall impact of the channel and/or publisher on a probability of completing a transaction. For example, in a condition where advertising is turned off for a channel and then turned on, the change in a total transaction value may provide an estimate of the overall impact of the channel. Similarly, a condition where a portion advertising is turned off for a channel and then turned on, the change in a total transaction value may provide an estimate of the overall impact of a portion of the channel. The system may estimate an overall impact of the channel based on the overall impact of the portion of the channel.

At Step 507, based on determining the overall channel effectiveness, the system may automatically tune the allocation model weights (from FIG. 2) for user-specific transactions. In some embodiments, for each user, the system may adjust the allocation weights (e.g. A,B,C) attributable to an advertising channel or publisher if they deviate too far from an overall impact of the channel. For example, in some embodiments, if the overall impact of a channel is much lower than an allocation weight attributed to that channel, the allocation weight may be reduced. In some embodiments, a threshold difference may be set, and if the allocation weight is higher than the overall impact by the threshold difference or more then the allocation weight may be reduced. For example, in some embodiments, if the overall impact of a channel is much higher than an allocation weight attributed to that channel, the allocation weight may be increased. In some embodiments, a threshold difference may be set, and if the allocation weight is lower than the overall impact by the threshold difference or more then the allocation weight may be increased. In some embodiments, the system may set a minimum allocation weight and/or a maximum allocation weight and may adjust the allocation weights if they fall outside of these values. For example, in some embodiments, the system may set a minimum allocation weight, maximum allocation weight, and/or an allocation weight range for each channel. In some embodiments, making changes to the allocation weights may involve making changes to an underlying model that impacts the allocation weights. For example, the system may make changes to a logistic regression model and/or neural network as described with respect to FIG. 3 Steps 304 and 307 to adjust the allocation weight to a channel. The changes may include adjusting the model's weighting of interactions on one or more channels.

In some embodiments, the system uses an automatic tuning process that looks for the optimal allocation weight constraints. The system may pre-specify the different levels of weight constraints for each allocation weight. Then the system may form a grid of all possible combinations of the constraints and select the best constraints. For example, the system may calculate a score for each combination of constraints in the grid based on its similarity to the overall impact determined from testing. The system may tune the allocation weights in accordance with the best constraints.

As shown in FIG. 5, the system may automatically repeat Steps 503-507 after a set period of time. For example, in some embodiments, the system may automatically repeat Steps 503-507 after each testing period of time that includes a time where some of the advertising is turned off and then some of the advertising is turned on (or vice versa). In other embodiments, the system may automatically repeat Steps 503-507 after a different period of time (including, e.g. a time set by Company Device 102).

At Step 509, the system may receive new user interactions, including new transaction information. The system may apportion the transaction amount based on the changed allocation weights determined in Step 507. Transaction apportionment may include any of the apportionment described with reference to FIG. 3 (including, e.g. Step 309) and/or FIG. 4 (including, e.g. Step 405).

At Step 511, the system may make automatic advertising changes based on the apportionment at Step 509. Advertising campaign changes may include any advertising changes describe above with reference to FIG. 4 (including, e.g. Step 409).

A company (e.g. through Company Device 102) may set one or more of the above processes (e.g. the processes shown in FIG. 3, FIG. 4, and FIG. 5) to continuously performed and/or to be performed after a set increment of time. In some embodiments, the processes may be performed at a hourly, daily, weekly, and/or monthly rate.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. Disclosed embodiments may include any one of the features in the claims, alone or in combination with one or more other feature in the claims, whether implemented as a method, by at least one processor, and/or stored as executable instructions on non-transitory computer readable media.

It is intended, therefore, that the specification and examples be considered as illustrative only, with a true scope and spirit being indicated by the following claims and their full scope of equivalents.

What is claimed is:

1. A computer-implemented system for incrementality monitoring, the system comprising:

a memory storing instructions; and at least one processor configured to execute the instructions to:

store at least one parameter for testing one of at least two channels;

determine the effectiveness of the one channel by testing the one channel based on the stored parameter;

update a user-specific model which weighs the impact that each of the at least two channels has on a user's purchasing tendencies based on determining a weight allocated to the one channel falls outside a maximum or minimum value indicated by the determined effectiveness;

track, via a tracker associated with one user device, one user interaction with a tracked communication leading up to a transaction, wherein the tracker is coded to detect one of a click on the tracked communication, swipe on the tracked communication, impression on the tracked communication, or mouse hovering over the tracked communication;

apportion the transaction by feeding the one user interaction into the updated model; and retrieve a new keyword for the one channel based on the apportionment;

display a new communication in response to receiving the new keyword on the one user device.

2. The system of claim 1, wherein the at least one parameter comprises at least one of:

parameters that indicate a period of time advertising will be turned on and a period of time that advertising will be turned off, parameters that indicate a period of time advertising will not be reduced and a period of time that advertising will be reduced, parameters that indicate a period of time advertising spending will not be reduced and a period of time that advertising spending will be reduced, a parameter that indicates a portion of advertising that will be turned off, a parameter that indicates a portion of advertising that will remain on, a parameter that indicates a portion of advertising spending that will be removed, a parameter that indicates a portion of advertising spending that will remain, a parameter that indicates a portion of a plurality of users that will receive advertising that is not reduced and a portion of the plurality of users that will receive reduced advertising, a parameter that indicates a portion of a plurality of users that will receive advertising and a portion of the plurality of users that will not receive advertising, or a first parameter for one of the at least two channels and a second parameter for another of the at least two channels.

3. The system of claim 2, wherein the at least one parameter indicates a period of time that advertising will not be reduced and a period of time that advertising will be reduced; and wherein the at least one processor is further configured to:

receive purchase data indicative of purchases made in the period of time that advertising is not reduced; and receive purchase data indicative of purchases made in the period of time that advertising is reduced.

4. The system of claim 3, wherein the at least one processor is further configured to:

determine the effectiveness of the at least one channel by comparing the purchase data indicative of purchases made in the period of time that advertising is not reduced to the purchase data indicative of purchases made in the period of time that advertising is reduced.

5. The system of claim 2, wherein the parameter indicates a portion of a plurality of users that will receive advertising that is not reduced and a portion of the plurality of users that will receive reduced advertising;

wherein the one processor is further configured to:

receive purchase data indicative of purchases made by the portion of the plurality of users that receive advertising that is not reduced; and receive purchase data indicative of purchases made by the portion of the plurality of users that receive reduced advertising.

6. The system of claim 5, wherein the at least one processor is further configured to:

determine the effectiveness of the at least one channel by comparing the purchase data indicative of purchases made by the portion of the plurality of users that receive advertising that is not reduced to the purchase data indicative of purchases made by the portion of the plurality of users that receive reduced advertising.

7. The system of claim 6, wherein updating the model comprises adjusting the weight allocated to the at least one channel based on the determined effectiveness.

8. The system of claim 7, wherein the model is a logistic regression model and adjusting the weight of the one channel based on the determined effectiveness comprises setting a weight range for the at least one channel and adjusting the model to weigh the at least one channel based on the weight range.

9. The system of claim 1, wherein the at least one processor is further configured to:

determine the effectiveness of a second channel of the at least two channels; and update the model based on the determined effectiveness of the second channel.

10. The system of claim 1, wherein the at least one processor is further configured to:

repeatedly perform the determination of the effectiveness of the one channel after an increment of time; and repeatedly update the model based on the determined effectiveness after the increment of time.

11. A computer-implemented method for incrementality monitoring, comprising:

storing at least one parameter for testing one of at least two channels;

determining the effectiveness of the one channel by testing the one channel based on the stored parameter;

updating a user-specific model which weighs the impact that each of the at least two channels has on a user's purchasing tendencies based on determining a weight allocated to the one channel falls outside a maximum or minimum value indicated by the determined effectiveness;

tracking, via a tracker associated with one user device, one user interaction with a tracked communication leading up to a transaction, wherein the tracker is coded to detect one of a click on the tracked communication, swipe on the tracked communication, impression on the tracked communication, or mouse hovering over the tracked communication;

apportioning the transaction by feeding the one user interaction into the updated model; and retrieving a new keyword for the one channel based on the apportionment;

displaying a new communication in response to receiving the new keyword on the one user device.

12. The method of claim 11, wherein the one parameter comprises one of:

parameters that indicate a period of time advertising will be turned on and a period of time that advertising will be turned off, parameters that indicate a period of time advertising will not be reduced and a period of time that advertising will be reduced, parameters that indicate a period of time advertising spending will not be reduced and a period of time that advertising spending will be reduced, a parameter that indicates a portion of advertising that will be turned off, a parameter that indicates a portion of advertising that will remain on, a parameter that indicates a portion of advertising spending that will be removed, a parameter that indicates a portion of advertising spending that will remain, a parameter that indicates a portion of a plurality of users that will receive advertising that is not reduced and a portion of the plurality of users that will receive reduced advertising, a parameter that indicates a portion of a plurality of users that will receive advertising and a portion of the plurality of users that will not receive advertising, or a first parameter for one of the at least two channels and a second parameter for another of the at least two channels.

13. The method of claim 12, wherein the at least one parameter indicates a period of time that advertising will not be reduced and a period of time that advertising will be reduced; and wherein method further comprises:

receiving purchase data indicative of purchases made in the period of time that advertising is not reduced; and receiving purchase data indicative of purchases made in the period of time that advertising is reduced.

14. The method of claim 13, further comprising:

determining the effectiveness of the at least one channel by comparing the purchase data indicative of purchases made in the period of time that advertising is not reduced to the purchase data indicative of purchases made in the period of time that advertising is reduced.

15. The method of claim 12, wherein the parameter indicates a portion of a plurality of users that will receive advertising that is not reduced and a portion of the plurality of users that will receive reduced advertising;

wherein the method further comprises:

receiving purchase data indicative of purchases made by the portion of the plurality of users that receive advertising that is not reduced; and receiving purchase data indicative of purchases made by the portion of the plurality of users that receive reduced advertising.

16. The method of claim 15, wherein the method further comprises:

determining the effectiveness of the at least one channel by comparing the purchase data indicative of purchases made by the portion of the plurality of users that receive advertising that is not reduced to the purchase data indicative of purchases made by the portion of the plurality of users that receive reduced advertising.

17. The method of claim 16, wherein updating the model comprises adjusting the weight allocated to the at least one channel based on the determined effectiveness.

18. The method of claim 17, wherein the model is a logistic regression model and adjusting the weight of the at least one channel based on the determined effectiveness comprises setting a weight range for the one channel and adjusting the model to weigh the one channel based on the weight range.

19. The method of claim 11, further comprising:

determining the effectiveness of a second channel of the at least two channels; and updating the model based on the determined effectiveness of the second channel.

20. A computer-implemented system for incrementality monitoring, the system comprising:

a memory storing instructions; and at least one processor configured to execute the instructions to:

store at least one parameter for testing at least one of at least two channels;

determine the effectiveness of the at least one channel by testing the at least one channel based on the stored parameter;

update a user-specific model which weighs the impact that each of the at least two channels has on a user's purchasing tendencies based on determining a weight allocated to the one channel falls outside a maximum or minimum value indicated by the determined effectiveness;

wherein the model is a logistic regression model and updating the model comprises adjusting the weight allocated to the one channel based on the maximum or minimum value indicated by the determined effectiveness;

track, via a tracker associated with one user device, at least one user interaction with a tracked communication leading up to a transaction, wherein the tracker is coded to detect at least one of a click on the tracked communication, swipe on the tracked communication, impression on the tracked communication, or mouse hovering over the tracked communication;

apportion the transaction by feeding the at least one user interaction into the updated model; and retrieve a new keyword for the one channel based on the apportionment;

display a new communication in response to receiving the new keyword on the at least one user device.

21. The system of claim 1, wherein the tracker is coded to provide a channel identifier to associate the at least one user interaction with a channel of the at least two channels.

* * * * *